United States Patent
Subbiah et al.

(10) Patent No.: US 11,973,699 B2
(45) Date of Patent: Apr. 30, 2024

(54) SYSTEMS AND METHODS FOR AUTO-DETECTION AND AUTO-CONFIGURATION OF UPLINKS AND SERVER INTERFACES FOR STORAGE SOLUTIONS

(71) Applicant: DELL PRODUCTS L.P., Round Rock, TX (US)

(72) Inventors: Ramesh Kumar Subbiah, Chennai (IN); Vibin Varghese, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 184 days.

(21) Appl. No.: 16/819,037

(22) Filed: Mar. 13, 2020

(65) Prior Publication Data

US 2021/0288924 A1 Sep. 16, 2021

(51) Int. Cl.
| | |
|---|---|
| *H04L 49/356* | (2022.01) |
| *H04L 12/46* | (2006.01) |
| *H04L 12/66* | (2006.01) |
| *H04L 41/12* | (2022.01) |
| *H04L 49/00* | (2022.01) |
| *H04L 49/354* | (2022.01) |
| *H04L 101/645* | (2022.01) |

(52) U.S. Cl.
CPC ........ *H04L 49/357* (2013.01); *H04L 12/4641* (2013.01); *H04L 12/66* (2013.01); *H04L 41/12* (2013.01); *H04L 49/354* (2013.01); *H04L 49/70* (2013.01); *H04L 2101/645* (2022.05)

(58) Field of Classification Search
None
See application file for complete search history.

(56) References Cited

U.S. PATENT DOCUMENTS

| | | | | |
|---|---|---|---|---|
| 8,571,052 | B2 * | 10/2013 | Carlson | H04L 49/357 370/395.2 |
| 9,811,347 | B2 * | 11/2017 | Munger | G06F 1/3203 |
| 2013/0243006 | A1 * | 9/2013 | Otsuka | H04L 49/357 370/401 |
| 2015/0172122 | A1 * | 6/2015 | DeCusatis | H04L 41/0659 370/228 |
| 2018/0234384 | A1 * | 8/2018 | Fang | G06F 13/4022 |
| 2018/0287966 | A1 * | 10/2018 | Kamath | G06F 9/45558 |

* cited by examiner

*Primary Examiner* — Derrick W Ferris
*Assistant Examiner* — Keith Follansbee
(74) *Attorney, Agent, or Firm* — NORTH WEBER & BAUGH LLP

(57) ABSTRACT

Presented are efficient systems and methods for automatically detecting and configuring network connections in Fibre Channel (FC) and similar networks. In various embodiments, this is accomplished by using an I/O module (IOM)'s fabric login (FLOGI) response or FLOGI request to identify the type of an uplink interface as either FC Gateway or FC Direct Attach, determining whether server interfaces coupled to the IOM support FCoE, and then, automatically configuring server interfaces based on the identified type of uplink interface.

20 Claims, 9 Drawing Sheets

800

SYSTEMS AND METHODS FOR AUTO-DETECTION AND AUTO-CONFIGURATION OF UPLINKS AND SERVER INTERFACES FOR STORAGE SOLUTIONS

BACKGROUND

The present disclosure relates generally to information handling systems. More particularly, the present disclosure relates to systems and methods for uplink detection and configuration in Fibre Channel (FC) networks.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conventional FC network systems, servers typically communicate data with FC storage devices through virtual fabrics (vfabrics), and several applications run on a server that has physical interface ports or enodes capable of transmitting Fibre Channel over Ethernet (FCoE) traffic. Setup procedures require configuring server-connected interfaces on each switch to properly control server behavior once the server is connected to uplink interfaces. Today's multi-chassis fabric deployments setup involves manually creating and configuring uplinks by a user (admin) and the deployment of server templates that match the uplink configurations. In practice, the user must perform numerous repetitive uplink configuration operations, such as manually choosing a mode of operation, such as FC gateway or FC direct attach, for each uplink interface for each fabric in a given cluster. In case of a large deployments comprising 10 or 20 chassis, these setup procedures are tedious, time-consuming, and known to be error-prone.

Accordingly, it is highly desirable to find more efficient systems and methods for uplink detection and configuration in FC and similar networks.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
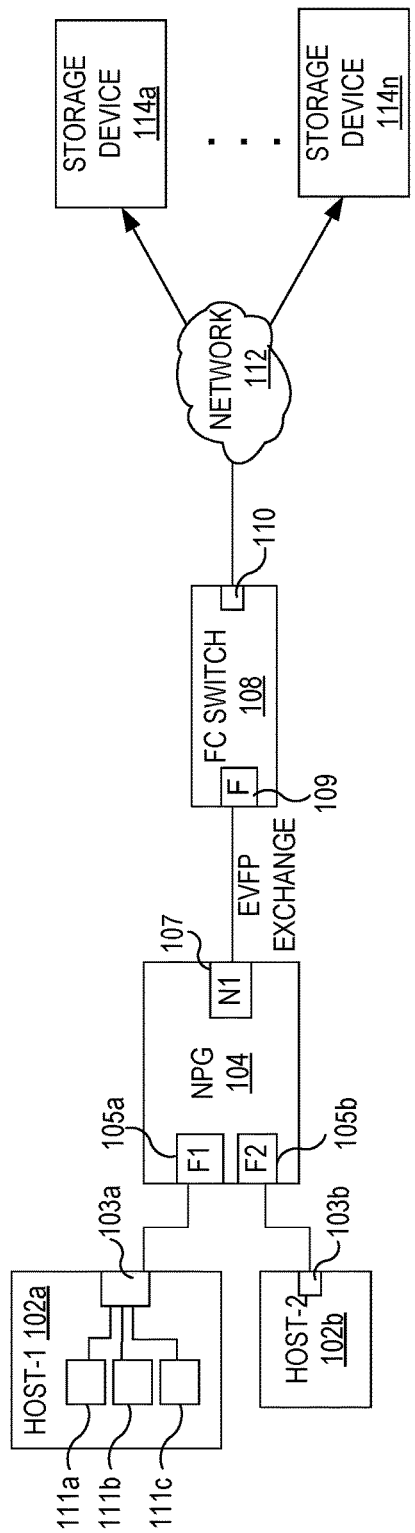
FIG. 1 is a schematic diagram of an existing FCoE-based network topology that connects host devices to storage devices.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

FIG. 1 is a schematic diagram of an existing FCoE-based network topology that connects host devices to storage devices such as servers. As depicted, network 100 comprises an FC forwarder device, such as N_port ID virtualization (NPIV) gateway (NPG) 104, host-1 102a and host-2 102b have respective physical Ethernet ports 103a and 103b that are connected to NPG 104 through physical fabric ports 105a and 105b. FC port 109 of FC switch 108, which may be part of a switch fabric, is connected to proxy node port 107 of NPG, and port 110 is connected to peripheral FC storage devices 114a-114n, here, via FC network 112 (e.g., the Internet). Storage devices 114a-114n may directly couple to FC switch 108 and may be part of a FC storage area network (SAN) receives FC communications that originates from hosts 102a and 102b, e.g., through FC switch 108, and send FC communication to the hosts through FC switch 108. NPG 104 is a switch or similar networking device that can connect to VN ports 111a-111c created in hosts 102a and 102b. NPG 104 may also be an FC forwarder device.

Host-1 102a and host-2 102b typically have several physical ports, e.g., converged network adaptors or host bus adaptors configured to provide traditional Ethernet and/or FCoE communications between NPG 104 and hosts 102a and 102b. Physical ports 103a and 103b are coupled to respective physical fabric ports 105a and 105b of NPG 104 via cable, e.g., an optical or copper wire cable. Host-1 102a and host-2 102b further have virtual node (VN) ports (e.g., 111a-111c) that share physical ports (e.g., 103a).

In operation, NPG 104 receives Ethernet traffic in the form of data frames from hosts 102a and 102b, converts them to FC frames before forwarding them to FC switch 108, and receives FC frames from FC switch 108. NPG 104 converts the frames received from FC switch 108 to Ethernet frames before forwarding them to hosts 102a and 102b.

During an initial handshake stage, NPG 104 and FC switch 108 communicate exchange-virtual-fabric-parameters (EVFPs) with each other. Then, applications of hosts 102a and 102b can create a VN port (e.g., port 111a) and log into a vfabric through a physical port, such as port 103a, to communicate through the corresponding VN port during a virtual node port session. FC switch 108 may also send a maintenance notice to NPG 104, such as an extended link service (ELS) command or a modified EVFP. In response to such notice, NPG 104 may return an acknowledgement signal, e.g., an ack-ELS command to FC switch 108.

Figure 2B:
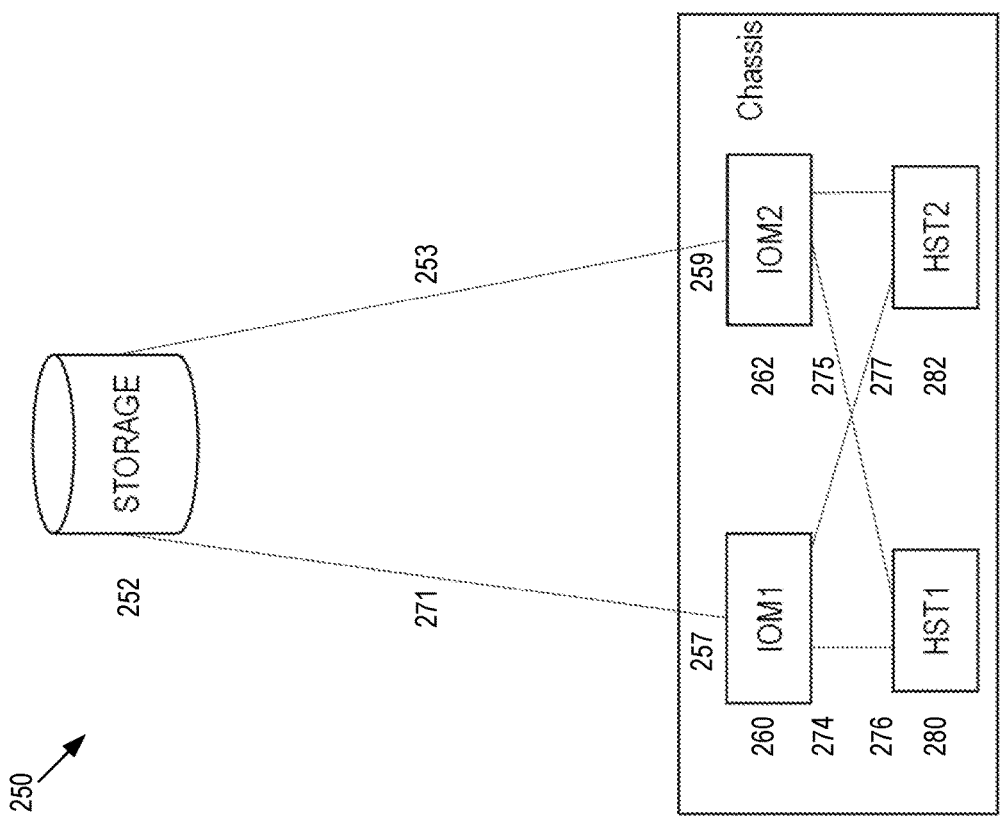
FIG. 2B depicts a schematic diagram of a network comprising an FC "direct attach" topology, according to embodiments of the present disclosure.
Figure 2A:
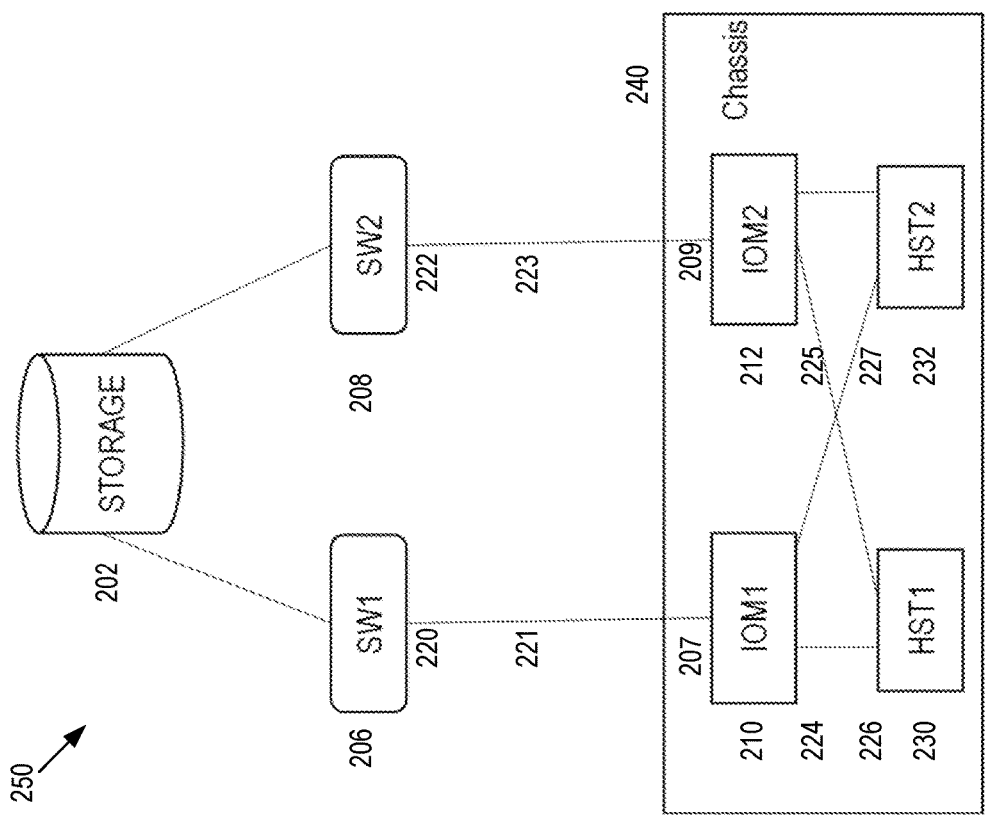
FIG. 2A depicts a schematic diagram of a network comprising an "FC gateway" or FCoE topology that connects hosts to a storage device, according to embodiments of the present disclosure.

FIG. 2A depicts a schematic diagram of a network comprising an FC Gateway or FCoE topology that connects hosts to a storage device, according to embodiments of the present disclosure. Network 200 may comprise FC switches 206 and 208 that may be coupled, e.g., via respective uplinks 221 and 223, to IOM1 210 and IOM2 212. As depicted in FIG. 2A, IOM1 210 comprises interfaces 207 and 224, and IOM2 212 comprises interfaces 209 and 225. While not shown in FIG. 2A, any number of ports may be coupled to a same uplink (e.g., 221), and hosts 230, 232 may be located in one or more physical chassis (e.g., chassis 240), and FC switches 206, 208 may comprise one or more physical devices.

In embodiments, storage device 202 may couple to FC switches 206, 208 and may be part of an FC storage area network (SAN) that is configured to receive FC communications from hosts 230, 232 through FC switches 206, 208 and send FC communications to hosts 230, 232 through FC switches 206, 208 that may perform switching tasks to transmit, e.g., FC traffic between IOMs 210, 212 and storage device 202, such as frames received at virtual or physical ports 220, 222. Storage device 202 may comprise virtual end nodes that define virtual links.

For purposes of illustration, only two hosts 230, 232 are shown in FIG. 2A. Yet, a person of skill in the art will appreciate that any number of hosts, IOMs, and other components may be coupled within or to network 200. For example, each switch 206, 208 in network 200 may be operatively or physically coupled to provide connectivity between one or more storage devices in storage 202 and one of IOMs 210, 212. As depicted, each IOM 210, 212 may be configured to send and receive Ethernet or FCoE data fames from each host 230, 232, e.g., via Ethernet network interface cards (NICs) that may be implemented in IOMs 210, 212 and may be associated with one of ports 224-227.

It is understood that one or more components in network 200 may be coupled to each other, e.g., via intermediate devices, by optical or electrical connections, such as optical or electrical cables and suitable connectors known in the art and not shown in FIG. 2A and FIG. 2B. It is further understood that one or more components in networks 200, 250 may be implemented by any combination of hardware and software and may perform additional or other functions apparent to those of ordinary skill in the art. For example, IOMs 210, 212 in FIG. 2A may comprise modules that prepare frames of a particular type for transmission to a physical or logical address to facilitate proper communication between various components in network 200. To do so, certain modules may, e.g., classify frames, convert them from one format to another, or modify them in any other way prior to initiating transmission.

In embodiments, an IOM may extract or decapsulate data from an Ethernet frame or a FCoE frame, e.g., to perform a lookup operation using a forwarding or routing table to determine based on the frame a destination MAC address, before selecting an appropriate port to direct traffic to one or more compatible device using an appropriate communication protocol, e.g., an FCoE network protocol or any other suitable protocol known in the art.

The topology of network 250 in FIG. 2B is similar to that illustrated in network 200 with the exception that storage 252 in network 250 is connected in a direct attach topology to IOMs 210, 212 without going through intermediate switches 206 and 208 shown in network 200 that form a gateway topology by acting as FC gateway devices 206, 208. For purposes of brevity, components similar to network 200 and their functions are not repeated here. Networks 200 and 250 may further comprise one or more model system management (MSM) modules (not shown) that, in embodiments, may manage or perform any number of functions herein, e.g., functions such as those discussed with respect to IOMs 210-212 and 260-262.

In embodiments, an IOM, e.g., IOM 210 in network 200 in FIG. 2A, may be configured as a master IOM that creates a vfabric comprising two or more IOMs (e.g., 210 and 212) and assigns FCoE VLAN identifiers to IOMs in the vfabric that may then be used to send FLOGIs on FC-configured uplink interfaces 207, 209. The vfabric may be part of, e.g., a data center switch fabric that comprises a local area network, a SAN, or any other type of network and subnetwork. In embodiments, to facilitate automatic detection of types of FC link connections on interfaces 207-209, FLOGIs may be sent on interfaces that are operationally up (e.g., 207). As discussed below with reference to FIG. 3, once an IOM (e.g., 210) receives a FLOGI response at one or more FC uplink interfaces (e.g., 207), those uplink interfaces may be identified and marked as FC gateway interfaces (e.g., in an IOM software table) and added to an uplink group. IOM software tables may be updated as needed, e.g., when new uplink interfaces are added as members of the uplink group. In embodiments, based on the type of uplink interface that has been identified, server interfaces, e.g., 226 and 227, may be configured, as will be discussed in greater detail below with reference to FIG. 6.

It is noted that for those IOM ports that have not received either a FLOGI response or a FLOGI request, in embodiments, one or more link resets may be initiated and, once a timeout condition is met or a link reset is received, IOMs (e.g., TOM 210) in the vfabric may resume sending FLOGIs on all available FC-configured uplink interfaces 207, 209.

Similarly, in network 250 in FIG. 2B, in response to an TOM (e.g., 260) receiving a FLOGI request at one or more FC uplink interfaces (e.g., 257), those interfaces may be added to an uplink group and, as discussed below with reference to FIG. 4, the FC-configured uplink may be marked in an TOM table as an FC direct attach interface. Then, server interfaces, e.g., 276 and 277, may be configured, as will be discussed in greater detail below with reference to FIG. 7.

In short, storage deployment for FC/FCOE solutions may detect the type of uplink that a given port (e.g., 207), which is expected to carry storage traffic, is coupled to, and based on that detection, server interfaces (e.g., 226) may be automatically configured.

Figure 3:
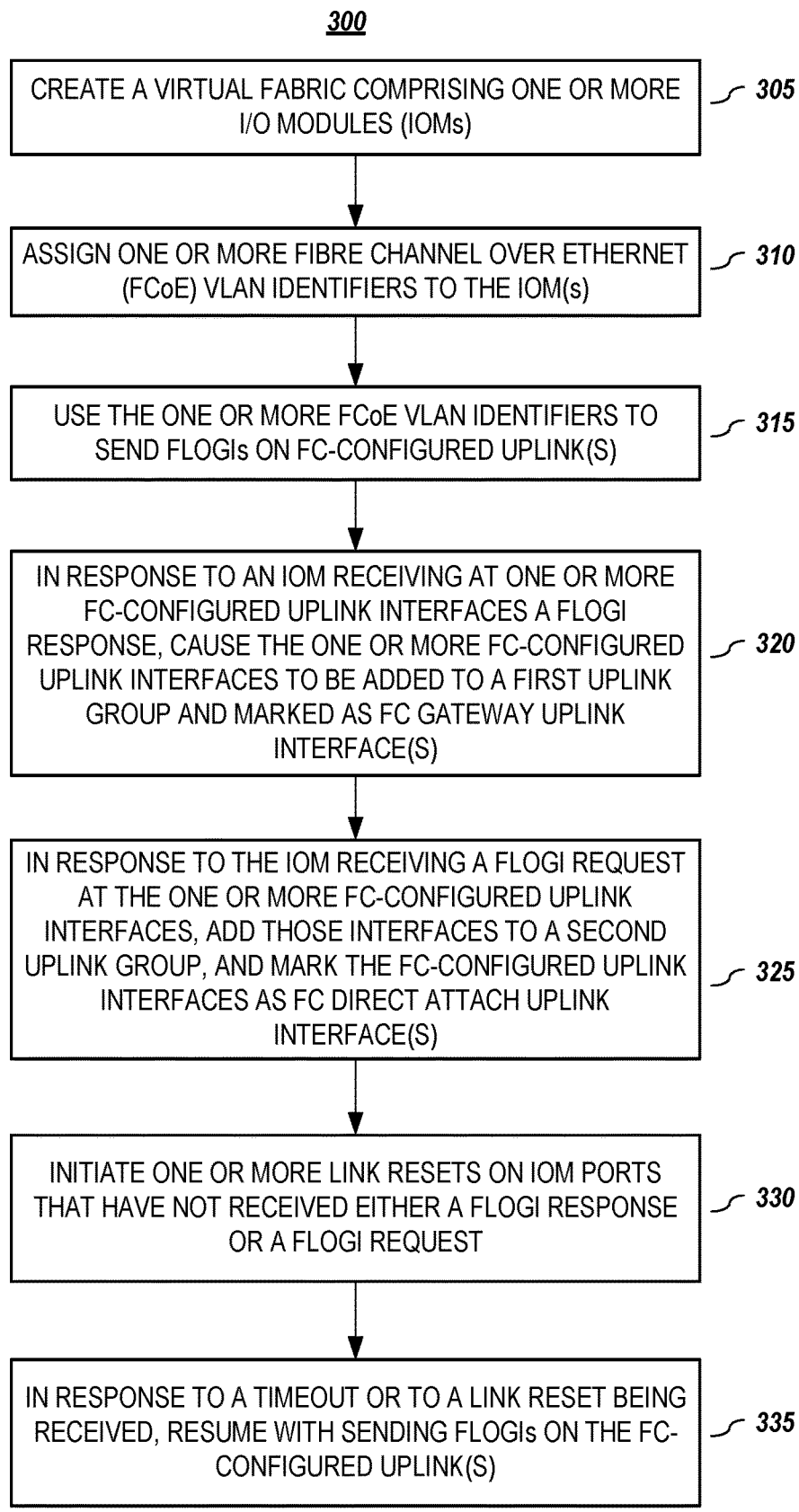
FIG. 3 is a flowchart illustrating a process for identifying types of uplink interfaces as FC gateway, according to embodiments of the present disclosure.

FIG. 3 is a flowchart illustrating a process for identifying types of uplink interfaces as FC gateway, according to embodiments of the present disclosure. In embodiments, the process for identifying types of uplink interfaces may begin by creating (305) a vfabric that comprises two or more IOMs that each may be assigned (310) a FCoE VLAN identifier. In embodiments, in response to obtaining information about the presence of available FC-configured uplink interfaces, an IOM may send (315) FLOGIs via those available uplink interfaces. In response to receiving the FLOGI response at those uplink interfaces, they may be added (320) to a first uplink group and marked as FC gateway interfaces. Similarly, in response to receiving a FLOGI request at one or more of the uplink interfaces, these uplink interfaces may be added (325) to a second uplink group and marked as FC direct attach interfaces. In embodiments, one or more link resets may be initiated (330) on TOM ports that have not received either a FLOGI response or a FLOGI request. Finally, in response to a timeout condition being met, or a link reset being received, process 300 may return (335) to the step of sending (315) FLOGIs via available uplink interfaces.

Figure 4:
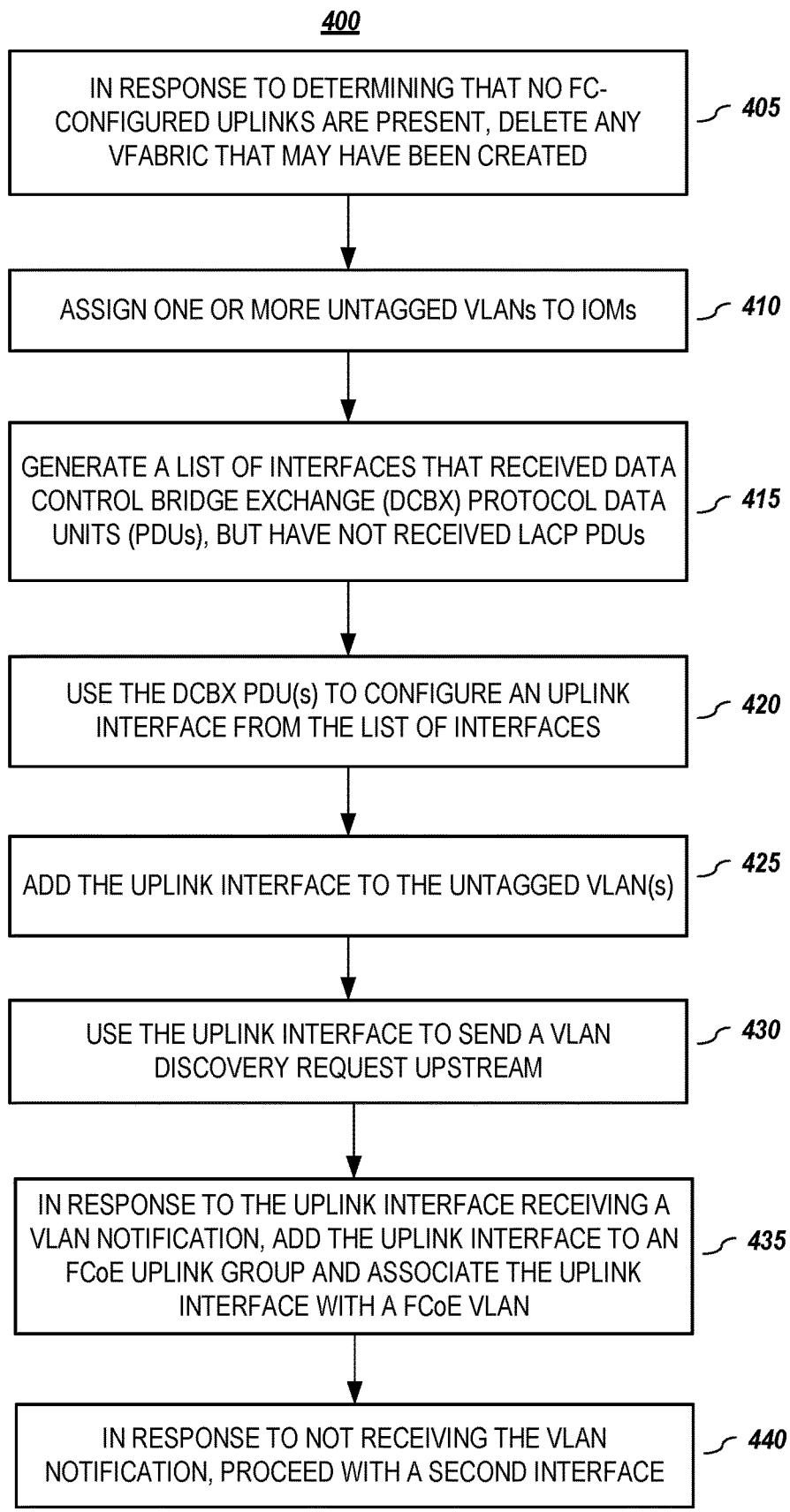
FIG. 4 is a flowchart illustrating a process for identifying types of uplink interfaces as FC direct attach, according to embodiments of the present disclosure

FIG. 4 is a flowchart illustrating a process for identifying types of uplink interfaces as FC direct attach, according to embodiments of the present disclosure. In embodiments, the process for identifying types of uplink interfaces may begin be deleting, in response to not receiving information about the presence of available uplink interfaces of one or more IOMs, any vfabric that may have been previously created. In embodiments, VLAN identifiers comprising an untagged VLAN may be assigned (410) to each IOM, and a list of uplink interfaces may be generated (415) that have received DCBx PDUs, but have not received LACP PDUs. The DCBx PDUs may then be used to configure (420) an uplink interface from the list of uplink interfaces. In embodiments, the uplink interface may be added (425) to one or more untagged VLANs. In embodiments, a VLAN discovery request may be sent (430) upstream, e.g., via the uplink interface, and, in response to receiving a VLAN notification, the uplink interface may be added (435) to an FCoE group and associated with a FCoE VLAN. Contrariwise, in response to not receiving the VLAN notification, process 400 may continue (440) with the next interface.

Figure 5:
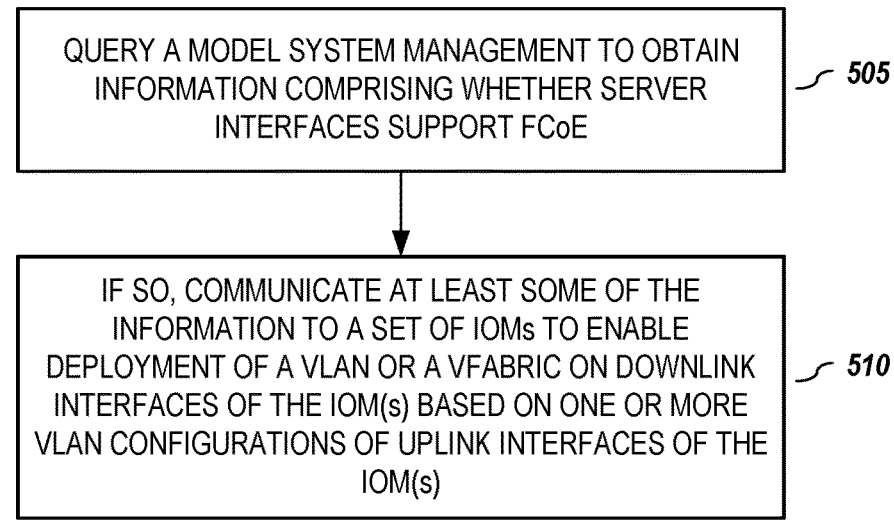
FIG. 5 is a flowchart illustrating a process for determining whether server interfaces support FCoE, according to embodiments of the present disclosure.

FIG. 5 is a flowchart illustrating a process for determining whether server interfaces support FCoE, according to embodiments of the present disclosure. In embodiments, process 500 may begin by querying (505) an MSM to obtain information comprising whether server interfaces support FCoE, e.g., to generate a list of server interfaces that have FCoE partition enabled. In embodiments, if the server interfaces do not support FCoE, some or all of content of the list may be communicated (510) to IOMs that are associated with the server interfaces in order to facilitate the deployment of VLAN or vfabric on IOM downlink interfaces, e.g., based on one or more VLAN configurations of uplink interfaces.

Figure 6:
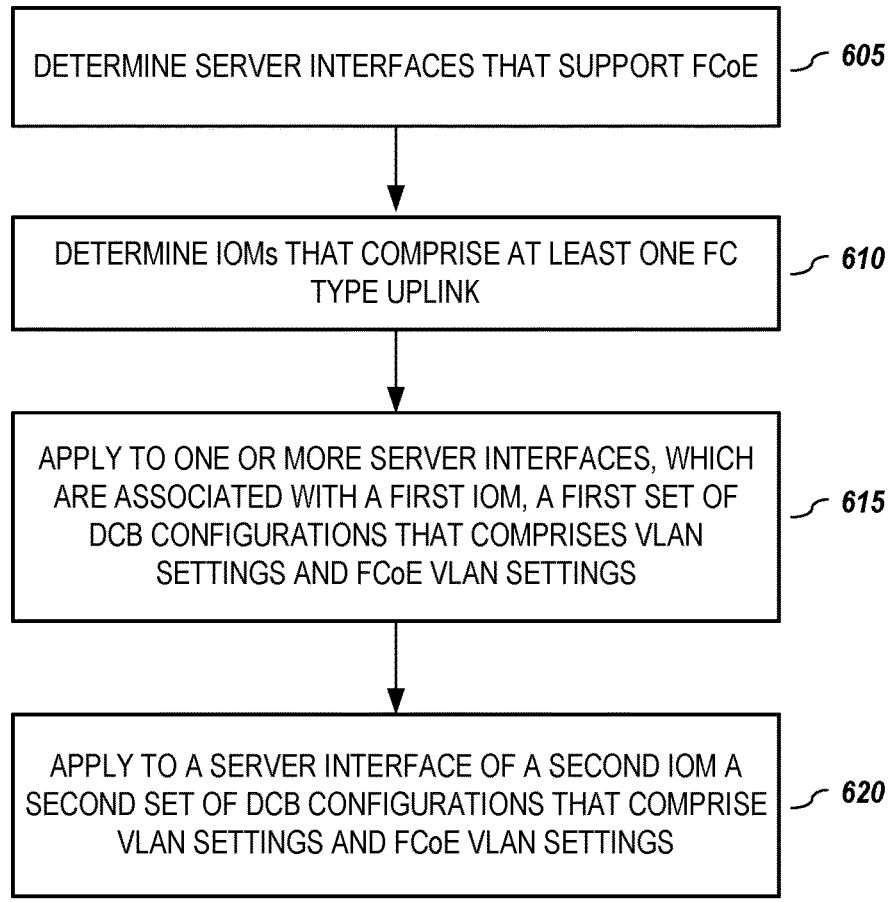
FIG. 6 is a flowchart illustrating a process for configuring server interfaces, according to embodiments of the present disclosure.

FIG. 6 is a flowchart illustrating a process for configuring server interfaces, according to embodiments of the present disclosure. In embodiments, process 600 may begin by determining (605) that server interfaces associated with a first and second IOM support FCoE. In embodiments, in response to determining (610) that an FC type of uplink is present (e.g., an FC gateway type), a first set of DCB configurations that comprise VLAN settings and FCoE VLAN settings may be applied (615) to a server interface associated with the first IOM. And a second set of DCB configurations comprising a second set of DCB configurations that comprise VLAN settings and FCoE VLAN settings may be applied (620) to a server interface associated with the second IOM.

Figure 7:
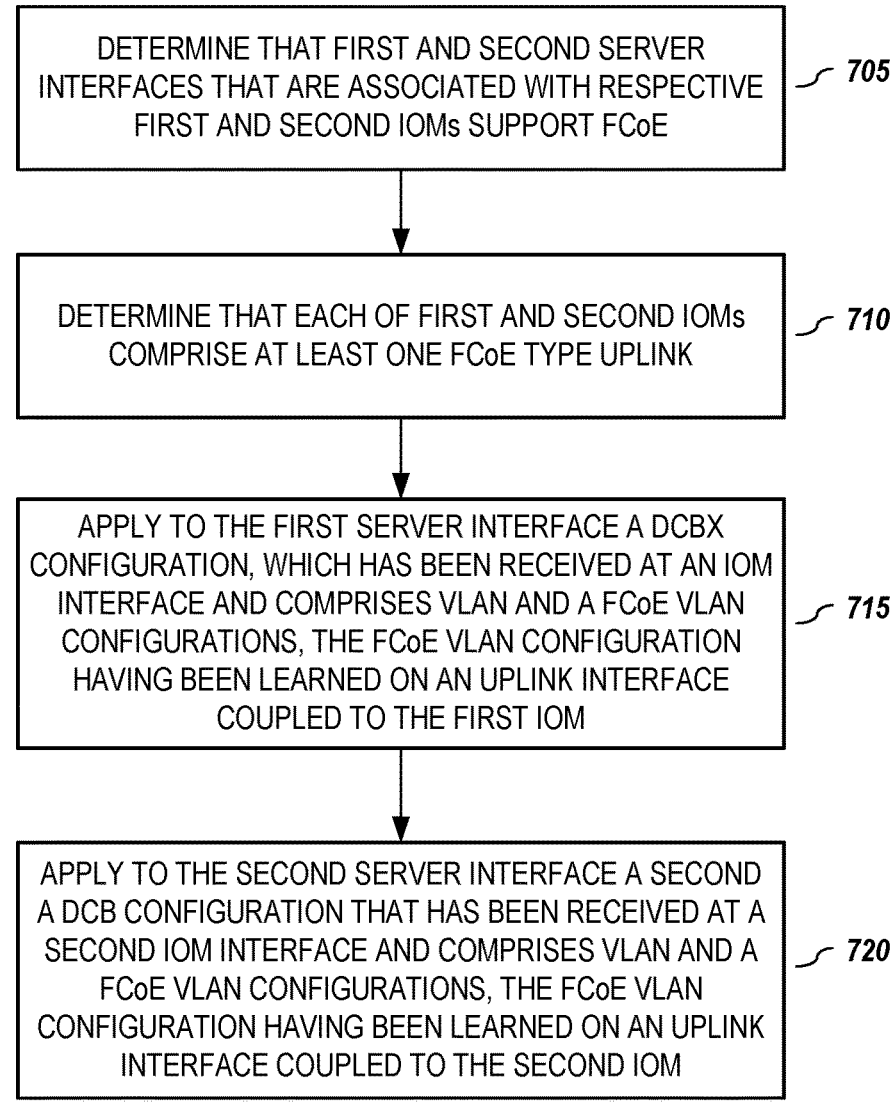
FIG. 7 is a flowchart illustrating another process for configuring server interfaces, according to embodiments of the present disclosure.

FIG. 7 is a flowchart illustrating another process for configuring server interfaces, according to embodiments of the present disclosure. In embodiments, process 600 may begin by determining (705) that server interfaces associated with a first and second IOM support FCoE. In embodiments, in response to determining (710) that an FCoE type of uplink is present, a first set of DCB configurations, which has been received at an IOM interface and comprises a VLAN configuration and a FCoE VLAN configuration, may be applied (715) to the first server interface, the FCoE VLAN configuration having been learned on an uplink interface coupled to the first IOM; and a second set of DCB configurations, which has been received at a second IOM interface and comprises a VLAN configuration and a FCoE VLAN configuration, may be applied (720) to the second server interface, wherein the FCoE VLAN configuration may have been learned on an uplink interface coupled to the second IOM.

It shall be noted that: (1) certain steps may optionally be performed; (2) steps may not be limited to the specific order set forth herein; (3) certain steps may be performed in different orders; and (4) certain steps may be done concurrently.

In one or more embodiments, aspects of the present patent document may be directed to, may include, or may be implemented on one or more information fling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
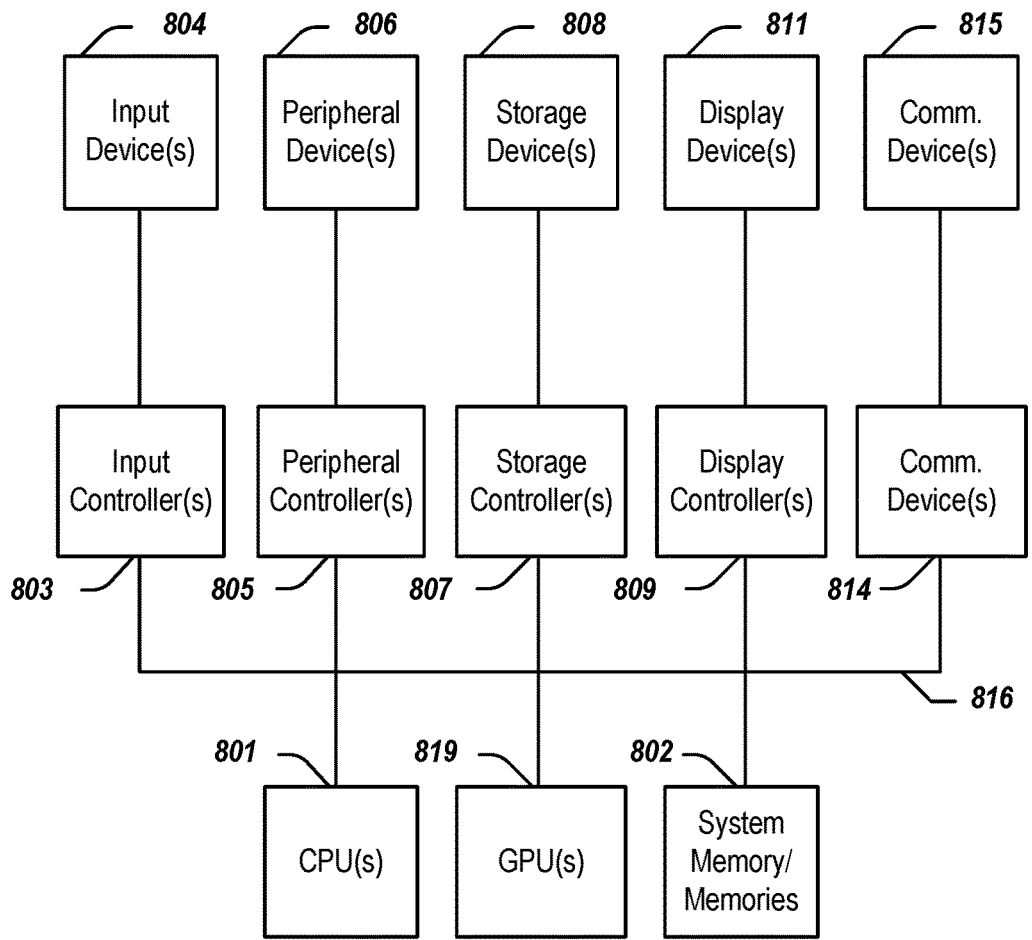
FIG. 8 depicts a simplified block diagram of an information handling system according to embodiments of the present invention.

FIG. 8 depicts a simplified block diagram of an information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, an FCoE/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 9:
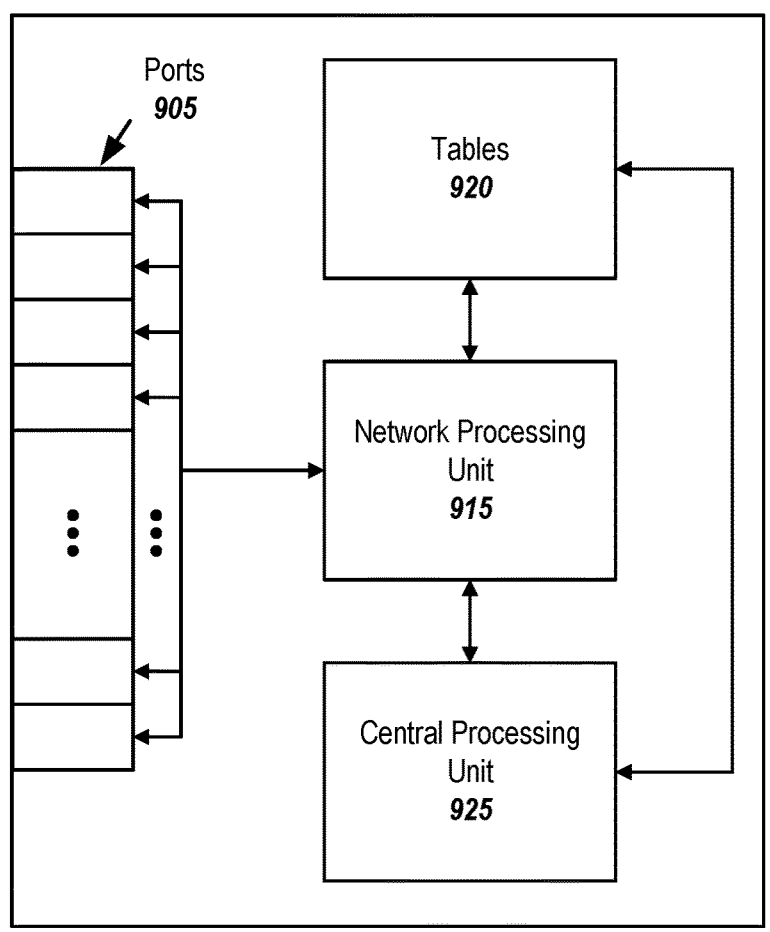
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components (including fewer or more components).

The information handling system 900 may include a plurality of I/O ports 905, a network processing unit (NPU) 915, one or more tables 920, and a central processing unit (CPU) 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for automatically detecting and configuring connections in a Fibre Channel over Ethernet (FCoE)-based communications network, the method comprising:
   given a virtual fabric (vfabric) comprising one or more I/O modules (IOMs), in which each of the one or more IOMs has been assigned an FCoE Virtual LAN (VLAN) identifier, at least one of the one or more IOMs performing steps comprising:
      responsive to obtaining information that an uplink interface of a IOM of the one or more IOMs is available, sending a fabric login (FLOGI) via the uplink interface that is available;
      in response to receiving at the uplink interface of the IOM a fabric login (FLOGI) response, identifying the uplink interface as a Fibre Channel (FC) Gateway type interface and causing the uplink interface to be added to a first uplink group and marked as an FC gateway interface;
      in response to receiving at the uplink interface a FLOGI request, identifying the uplink interface as an FC Direct Attach type interface and causing the uplink interface to be added to a second uplink group and marked as an FC direct attach interface;
      determining whether a server interface coupled to the IOM support FCoE; and
   configuring the server interface based on the type of uplink interface identified.

2. The computer-implemented method according to claim 1, further comprising the steps of:
   for each uplink interface in which neither a FLOGI response nor a FLOGI request was received:
      initiating one or more link resets on the uplink interface; and
      in response to a timeout condition being met or a link reset being received, resuming with the step of sending a FLOGI via the uplink interface.

3. The computer-implemented method according to claim 1, further comprising the steps of:
   in response to not receiving the information, deleting the vfabric;
   assigning to each set of IOMs VLAN identifiers that comprise an untagged VLAN;
   generating a list of uplink interfaces that have received data control bridge exchange (DCBx) protocol data units (PDUs), but have not received link aggregation control protocol (LACP) PDUs;
   using one or more of the DCBx PDUs to configure an uplink interface from the list of uplink interfaces;
   adding the uplink interface to one or more untagged VLANs;

via the uplink interface, sending a VLAN discovery request upstream;

in response to receiving a VLAN notification, adding the uplink interface to an FCoE group; and associating the uplink interface with an FCoE VLAN.

4. The computer-implemented method according to claim 3, further comprising, in response to not receiving the VLAN notification, proceeding with a second interface.

5. The computer-implemented method according to claim 1, wherein configuring the server interface comprises the steps of:

in response to determining that a type of the uplink interface is present at a first IOM:

applying to a server interface associated with the first TOM a first set of control bridge exchange (DCB) configurations that comprise Virtual LAN (VLAN) settings and FCoE VLAN settings; and applying to a server interface of a second IOM a second set of DCB configurations that comprise VLAN settings and FCoE VLAN settings.

6. The computer-implemented method according to claim 1, wherein configuring the server interfaces comprises the steps of:

in response to determining that an FCoE type uplink is present:

applying to a server interface of a first IOM a control bridge exchange (DCB) configuration that has been received at an IOM interface and comprises a Virtual LAN (VLAN) configuration and an FCoE VLAN configuration, the FCoE VLAN configuration having been learned on an uplink interface coupled to the first IOM; and applying to a server interface of a second IOM a second DCB configuration that has been received at a second IOM interface and comprises a VLAN configuration and an FCoE VLAN configuration, the FCoE VLAN configuration having been learned on an uplink interface coupled to the second IOM.

7. The computer-implemented method according to claim 1, wherein determining whether a server interface coupled to the IOM support FCoE comprises the steps of:

querying a model system management (MSM) to obtain information comprising whether server interfaces of a set of IOMs support FCoE; and communicating at least some of the information to one or more IOMs associated with the server interfaces to facilitate deployment of a Virtual LAN (VLAN) or the vfabric on one or more TOM downlink interfaces based on one or more VLAN configurations of uplink interfaces.

8. The computer-implemented method according to claim 7, wherein querying is performed by an IOM.

9. The computer-implemented method according to claim 8, wherein the information further comprises partition information about the server interfaces.

10. The computer-implemented method according to claim 7, wherein the server interfaces comprise a converged network adapter (CNA) interface that is coupled to at least one of the VLAN or the vfabric.

11. A non-transitory computer-readable medium or media comprising one or more sequences of instructions which, when executed by at least one processor, causes steps to be performed comprising:

given a virtual fabric (vfabric) comprising one or more I/O modules (IOMs), in which each of the one or more IOMs has been assigned a Fibre Channel over Ethernet (FCoE) Virtual LAN (VLAN) identifier, for at least one of the one or more IOMs:

responsive to obtaining information that an uplink interface of the IOM is available, sending a fabric login (FLOGI) via the uplink interface that is available;

in response to receiving at the uplink interface of the IOM a fabric login (FLOGI) response, identifying the uplink interface as a Fibre Channel (FC) Gateway type interface and causing the uplink interface to be added to a first uplink group and marked as FC gateway interface;

in response to receiving at the uplink interface a FLOGI request, identifying the uplink interface as an FC Direct Attach type interface and causing the uplink interface to be added to a second uplink group and marked as FC direct attach interface;

determining whether a server interface coupled to the TOM support FCoE; and based on the type of uplink interface identified, configuring the server interface.

12. The non-transitory computer-readable medium or media of claim 11, wherein the non-transitory computer-readable medium or media further comprises one or more sequences of instructions which, when executed by at least one processor, causes steps to be performed comprising:

for each uplink interface in which neither a FLOGI response nor a FLOGI request was received:

initiating one or more link resets on the uplink interface; and in response to a timeout condition being met or a link reset being received, resuming with the step of sending a FLOGI via the uplink interface.

13. The non-transitory computer-readable medium or media of claim 11, wherein the non-transitory computer-readable medium or media further comprises one or more sequences of instructions which, when executed by at least one processor, causes steps to be performed comprising:

in response to not receiving the information, deleting the vfabric;

assigning to each set of IOMs identifiers;

generating a list of uplink interfaces that have received data control bridge exchange (DCBx) protocol data units (PDUs), but have not received link aggregation control protocol (LACP) PDUs;

using one or more of the DCBx PDUs to configure an uplink interface from the list of uplink interfaces;

adding the uplink interface to one or more untagged VLANs;

via the uplink interface, sending a VLAN discovery request upstream;

in response to receiving a VLAN notification, adding the uplink interface to an FCoE group; and associating the uplink interface with an FCoE VLAN.

14. The non-transitory computer-readable medium or media of claim 11, wherein configuring the server interface comprises the steps of:

determining that server interfaces of a first and second I/O module (TOM) interfaces of an IOM support Fibre Channel over Ethernet (FCoE);

in response to determining that a set of FC type uplinks is present, applying to a server interface of the first IOM a first set of control bridge exchange (DCB) configurations that comprise Virtual LAN (VLAN) settings and Fibre Channel over Ethernet (FCoE) VLAN settings; and applying to a server interface of the second IOM a second set of DCB configurations comprising a second set of DCB configurations that comprise VLAN settings and FCoE VLAN settings.

15. The non-transitory computer-readable medium or media of claim 11, wherein determining whether the server interface coupled to the IOM support FCoE comprises the steps of:
  querying a model system management (MSM) to obtain information comprising whether one or more server IOM interfaces of a set of IOMs support FCoE;
  using the information to generate a list of server IOM interfaces that have FCoE partition enabled; and
  communicating some or all of content of the list to IOMs associated with the server IOM interfaces to facilitate deployment of a Virtual LAN (VLAN) or the vfabric on TOM uplink interfaces as one of FC uplink type or FCoE uplink type.

16. A Fibre Channel (FC) system for automatically detecting and configuring connections in a FCoE-based communications network, the system comprising:
  an I/O module (IOM), the IOM being part of a virtual fabric (vfabric);
  a processor coupled to the IOM;
  one or more server interfaces coupled to the IOM;
  a model system management (MSM) coupled to the IOM and the one or more server interfaces; and
  a non-transitory computer-readable medium or media comprising instructions that, when executed by the processor, cause steps to be performed comprising:
    responsive to obtaining information that an uplink interface of the IOM is available, sending a fabric login (FLOGI) via the uplink interface that is available;
    in response to receiving at the uplink interface of the IOM a fabric login (FLOGI) response, identifying the uplink interface as an FC Gateway type interface and causing the uplink interface to be added to a first uplink group and marked as an FC gateway interface;
    in response to receiving at the uplink interface of the IOM a FLOGI request, identifying the uplink interface as an FC Direct Attach type interface and causing the uplink interface to be added to a second uplink group and marked as an FC direct attach interface; and
    for each uplink interface in which neither a FLOGI response nor a FLOGI request was received:
      initiating a link reset on the uplink interface that has not received either the FLOGI response or the FLOGI request; and
      in response to a timeout condition being met or a link reset being received, resuming with the step of sending a FLOGI via the uplink interface.

17. The FC system according to claim 16, wherein at least one of the one or more server interfaces are coupled to a converged network adapter (CNA) interface that is coupled to the vfabric.

18. The FC system according to claim 16, wherein the non-transitory computer-readable medium or media further comprises instructions that, when executed by the processor, cause steps to be performed comprising:
  determining whether one or more of the one or more server interfaces support Fibre Channel over Ethernet (FCoE); and
  based on the type of uplink interface identified, configuring at least one of the one or more the server interfaces.

19. The FC system according to claim 18, wherein determining whether the one or more server interfaces support FCoE comprises querying the MSM.

20. The FC system according to claim 18, wherein configuring one or more server interfaces comprises applying to at least one of the one or more server interfaces a set of control bridge exchange (DCB) configurations that comprise one or more Virtual LAN (VLAN) settings.

* * * * *